US012623736B2

(12) United States Patent
Nallet et al.

(10) Patent No.: US 12,623,736 B2
(45) Date of Patent: May 12, 2026

(54) CABIN, TRUCK COMPRISING THE CABIN, AND ASSOCIATED METHOD

(71) Applicant: Volvo Truck Corporation, Gothenburg (SE)

(72) Inventors: Sebastien Nallet, Venerieu (FR); Xavier Dolmazon, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 50 days.

(21) Appl. No.: 18/909,391

(22) Filed: Oct. 8, 2024

(65) Prior Publication Data

US 2025/0121895 A1     Apr. 17, 2025

(30) Foreign Application Priority Data

Oct. 16, 2023     (EP) ..................................... 23203822

(51) Int. Cl.
| | |
|---|---|
| *B62D 51/00* | (2006.01) |
| *B60J 5/04* | (2006.01) |
| *B60R 16/023* | (2006.01) |
| *B60R 16/033* | (2006.01) |
| *B62D 33/06* | (2006.01) |
| *B62D 51/04* | (2006.01) |

(52) U.S. Cl.
CPC .......... *B62D 51/001* (2013.01); *B60J 5/0497* (2013.01); *B60R 16/0231* (2013.01); *B60R 16/033* (2013.01); *B62D 33/06* (2013.01); *B62D 51/04* (2013.01); *B60J 5/0491* (2013.01)

(58) Field of Classification Search
CPC .............................. B62D 51/001; B60K 35/10
See application file for complete search history.

(56) References Cited

U.S. PATENT DOCUMENTS

| | | | |
|---|---|---|---|
| 10,893,242 B1 * | 1/2021 | Spivey | .................. H04N 7/185 |
| 2013/0145460 A1 | 6/2013 | Dudley et al. | |
| 2018/0098481 A1 | 4/2018 | Barzen | |
| 2018/0247470 A1 | 8/2018 | Yui | |
| 2020/0062185 A1 * | 2/2020 | Scaringe | ................ B60J 5/0491 |

(Continued)

FOREIGN PATENT DOCUMENTS

| | | | | |
|---|---|---|---|---|
| BE | 1003891 A7 * | 7/1992 | .............. | B60P 3/226 |
| CA | 2368257 A1 * | 11/2000 | ............. | G02B 6/001 |

(Continued)

OTHER PUBLICATIONS

European Search Report for European Patent Application No. 23203822.4, completed Apr. 10, 2024, 2 pages.

*Primary Examiner* — Nicole T Verley

(74) *Attorney, Agent, or Firm* — Withrow & Terranova, PLLC

(57)     ABSTRACT

A cabin for a truck, the cabin comprising a cabin door, to provide access for a user to an interior of the cabin; an exterior surface, which is accessible from outside the cabin when the cabin door is closed; a window, positioned at a window height; and a control panel, comprising a plurality of controls, each control being configured to be operated by the user to control an equipment of the truck, wherein the control panel is secured to the exterior surface at a control panel height, equal or inferior to the window height, so that the controls can be operated by the user when the user stands outside of the cabin and with the cabin door closed.

15 Claims, 4 Drawing Sheets

-3-

(56)                     References Cited

U.S. PATENT DOCUMENTS

2022/0289108 A1 *   9/2022   Burbank  ................... B60R 1/25
2025/0121895 A1 *   4/2025   Nallet  ................. B62D 51/001

FOREIGN PATENT DOCUMENTS

| | | | | | |
|---|---|---|---|---|---|
| CH | 692107 | A5 * | 2/2002 | ........... | B62D 33/042 |
| DE | 102005002577 | B3 * | 10/2006 | .............. | B60R 7/02 |
| EP | 1842825 | A2 * | 10/2007 | ......... | B66F 9/07581 |
| EP | 2603752 | B1 * | 10/2016 | ........... | F25D 29/003 |
| EP | 3248858 | A1 | 11/2017 | | |
| EP | 3248858 | B1 | 10/2020 | | |
| IT | 201800009643 | A1 | 4/2020 | | |
| WO | WO-2009050986 | A1 * | 4/2009 | ............ | B62D 51/04 |
| WO | WO-2010076591 | A1 * | 7/2010 | ............ | B62D 25/24 |
| WO | WO-2012021377 | A2 * | 2/2012 | ........... | F25D 29/003 |

* cited by examiner

CABIN, TRUCK COMPRISING THE CABIN, AND ASSOCIATED METHOD

PRIORITY APPLICATIONS

The present application claims priority to European Patent Application No. 23203822.4, filed on Oct. 16, 2023, and entitled "CABIN, TRUCK COMPRISING THE CABIN, AND ASSOCIATED METHOD," which is incorporated herein by reference in its entirety.

TECHNICAL FIELD

The disclosure relates generally to trucks. In particular aspects, the disclosure relates to a cabin for a truck, a truck comprising the cabin, and an associated method. The disclosure can be applied to commercial vehicles, such as trucks, buses, and construction equipment, among other vehicle types. Although the disclosure may be described with respect to a particular vehicle, the disclosure is not restricted to any particular vehicle.

BACKGROUND

It is well-known that a user of a commercial vehicle may need to operate equipment of the truck outside a truck cabin, and be able to see the equipment, or surroundings of the truck while operating the equipment. Controls to operate the equipment are usually inside the cabin, on a dashboard of the cabin. In this case, the user needs to get in and out of the cabin in order to operate the equipment and to see the equipment or the surroundings of the truck. To facilitate entry and exit of the cabin, the user generally keeps a door of the cabin open during operation of the equipment. As a result, the field of vision of the user is obstructed by the door, and the maneuverability of the truck is decreased. Furthermore, repeatedly entering and exiting the cabin is time-consuming and tiresome for the user. Further, there is a risk of work related accident. It is also known to include commands in the door panel, however this means that the equipment is operated while keeping the door open.

SUMMARY

According to a first aspect of the disclosure, the invention relates to a cabin, for a truck, the cabin comprising:
- a cabin door, to provide access for a user to an interior of the cabin;
- an exterior surface, the exterior surface being a surface of the cabin which is accessible from outside the cabin when the cabin door is closed;
- a window, positioned at a window height relative to a bottom of the cabin; and
- a control panel, comprising a plurality of controls, each control being configured to be operated by the user to control an equipment of the truck, wherein the control panel is secured to the exterior surface at a control panel height, relative to the bottom of the cabin, equal or inferior to the window height, so that the controls can be operated by the user when the user stands outside of the cabin and with the cabin door closed, each equipment being an equipment among a group comprising:
  - motor equipment of the truck;
  - auxiliary equipment of the truck; and
  - bodybuilder equipment of the truck.

The first aspect of the disclosure may seek to make the operation of the equipment of the truck more efficient for the user. A technical benefit may include improved visibility, safety and quicker operation of the equipment. Indeed, thanks to the invention, it is possible to control equipment of the truck without the user otherwise being in contact with the cabin nor the truck, such as standing on the cabin or the truck, sitting on or inside the cabin or the truck, climbing on the cabin or the truck. As the operator does not need to continuously climb into or on the cabin to control the equipment and outside of the cabin to check the correct operation of the equipment, operating the equipment is quicker. Improved visibility, because of the closed door, while operating the equipment is also achieved. Finally, keeping the door closed while operating the equipment also improves safety, as other people cannot enter the cabin and there is no risk of collision of exterior elements such as cars, or people, with the open door, and improved maneuverability of the truck, as the closed door decreases a volume occupied by the truck.

In some examples, the control panel is secured next to said door, or at least on a cabin side of the cabin where said cabin door is also positioned.

In some examples, when the cabin includes several cabin doors to give access to the interior of the cabin to the user when open, the control panel is secured to the exterior surface, so that the controls can be operated by the user when the user stands outside of the cabin and with all the cabin doors closed.

In some examples, including in at least one preferred example, optionally the cabin further comprises an exterior compartment comprising:
- a hollow recess, formed on the exterior surface of the cabin; and
- a closable lid, configured to move between a closed position, wherein the lid covers the hollow recess, and an open position, wherein the lid leaves at least a portion of the hollow recess uncovered, the lid being configured to move from the closed position to the open position independently from the position of the cabin door,
- and wherein the control panel is secured in the hollow recess.

A technical benefit may include providing a storage space for the control panel and preventing external elements such as dust and water from coming into contact with the control panel.

In some examples, including in at least one preferred example, optionally the exterior surface comprises a door side, the cabin door being located on the door side, and wherein the control panel is secured at the door side. A technical benefit may include making the control panel easily accessible by the user.

In some examples, including in at least one preferred example, optionally the window is a door window equipped on the cabin door. A technical benefit may include making the control panel easily accessible by the user.

In some examples, including in at least one preferred example, optionally the window height is measured at a bottom frame edge of the window. A technical benefit may include securing the control panel at a height accessible to the user without having to climb on or in the cabin.

In some examples, including in at least one preferred example, optionally the cabin door includes a door handle positioned on the exterior surface at a handle height relative to the bottom of the cabin, wherein the door handle is operable from the outside of the cabin for disengaging the cabin door from a closed position, when the cabin door was engaged in the closed position, wherein the control panel height is equal or inferior to the door handle height. A technical benefit may include securing the control panel at a height accessible to the user without having to climb on or in the cabin.

In some examples, including in at least one preferred example, optionally the control panel further comprises a display screen for displaying a state of the equipment controlled by the control or for displaying images acquired by a camera equipped on the truck. A technical benefit may include helping the user to operate the equipment in a safer way, by being aware of the state of the equipment and of surroundings of the truck.

In some examples, including in at least one preferred example, optionally the control panel comprises a fixed part, fixedly secured to the exterior surface and including at least one of the controls. A technical benefit may include preventing a loss of the control panel, for example by falling from the exterior surface.

In some examples, including in at least one preferred example, optionally the control panel comprises a removable part, removably secured to the exterior surface and including at least one of the controls, wherein the removable part is movable between a secured configuration, wherein the removable part is secured to the exterior surface, and a remote configuration, wherein the removable part is removed from the exterior surface for being held at a distance from the exterior surface by the user to control the equipment of the truck from said distance. A technical benefit may include increasing the mobility and safety of the user when operating the equipment.

In some examples, including in at least one preferred example, optionally the removable part is a remote control. A technical benefit may include making the removable part practical and easy to use.

In some examples, including in at least one preferred example, optionally the removable part is a mobile terminal device, such as a smartphone. A technical benefit may include making the removable part practical and easy to use.

In some examples, including in at least one preferred example, optionally the removable part includes an embedded electrical storage, wherein the cabin further comprises a charging station secured to the exterior surface and wherein the removable part is connected to the charging station when in the secured configuration for the charging station to supply electrical power to the embedded electrical storage and disconnected from the charging station when in the remote configuration. A technical benefit may include making the removable part easier to use by providing it with its own electrical supply.

According to a second aspect of the disclosure, the invention relates to a truck, comprising a cabin according to the examples described above. The second aspect of the disclosure may seek to provide a truck that makes the operation of equipment of the truck quicker, safer and easier for the user. A technical benefit may include a more efficient and safer operation of the equipment of the truck.

In some examples, including in at least one preferred example, optionally the truck further comprises the equipment controlled by the controls of the control panel, said equipment being an equipment among a group comprising:
  motor equipment of the truck;
  auxiliary equipment of the truck; and
  bodybuilder equipment of the truck.
A technical benefit may include controlling the equipment of the truck in a more efficient and safer way.

In some examples, including in at least one preferred example, optionally the truck further comprises a chassis, the cabin being secured to the chassis via the bottom of the cabin. A technical benefit may include improving the robustness of the truck.

In some examples, including in at least one preferred example, optionally the control panel further comprises a display screen for displaying a state of the equipment controlled by the control or for displaying images acquired by a camera equipped on the truck, and wherein the truck comprises a sensor, configured to measure a parameter representative of the state of the equipment controlled by the control. A technical benefit may include providing additional information to the user, and therefore helping the user to operate the equipment in a safer way.

In some examples, including in at least one preferred example, optionally the control panel further comprises a display screen for displaying a state of the equipment controlled by the control or for displaying images acquired by a camera equipped on the truck, and wherein the truck comprises the camera, configured to acquire images of surroundings of the truck. A technical benefit may include helping the user to operate the equipment in a safer way by providing information about the surroundings of the truck.

According to a third aspect of the disclosure, the invention further relates to a method, for controlling an equipment of a truck, the equipment being an equipment among a group comprising:
  motor equipment of the truck;
  auxiliary equipment of the truck; and
  bodybuilder equipment of the truck,
  the truck comprising a cabin, comprising:
  a cabin door, to provide access for a user to an interior of the cabin;
  an exterior surface, the exterior surface being a surface of the cabin which is accessible from outside the cabin when the cabin door is closed;
  a window, positioned at a window height relative to a bottom of the cabin; and
  a control panel, comprising a plurality of controls, each control being configured to be operated by the user to control said equipment of the truck, wherein the control panel is secured to the exterior surface at a control panel height, relative to the bottom of the cabin, equal or inferior to the window height, the method comprising:
  while the cabin door is closed and the user is standing outside the cabin, operating the controls to control the equipment, by the user.

The third aspect of the disclosure may seek to make the operation of equipment of the truck more efficient for the user. A technical benefit may include a more efficient and safer operation of the equipment of the truck by the user.

In some examples, including in at least one preferred example, optionally the method further comprises moving a closable lid from a closed position, wherein the lid covers a hollow recess formed on the exterior surface of the cabin, to an open position wherein the lid leaves at least a portion of the hollow recess uncovered, wherein the control panel is secured in the hollow recess, and wherein operating the controls includes that the lid is in the open position, in addition to the cabin door being closed and the user standing outside of the cabin. A technical benefit may include better location and providing a storage space for the control panel while still making the control panel accessible to the user.

In some examples, including in at least one preferred example, optionally the control panel comprises a fixed part, fixedly secured to the exterior surface and including at least one of the controls, the cabin further comprising a removable part, removably secured to the exterior surface and including at least one of the controls, the second control panel comprising a plurality of second controls, wherein the method further comprises:

removing the removable part from the exterior surface by the user;

holding the removable part at a distance from the exterior by the user; and while the truck cabin door is closed and the user is standing on the ground, operating the at least one of the controls included on the removable part, to control the equipment of the truck, by the user.

A technical benefit may include easier operation of the controls for the user.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
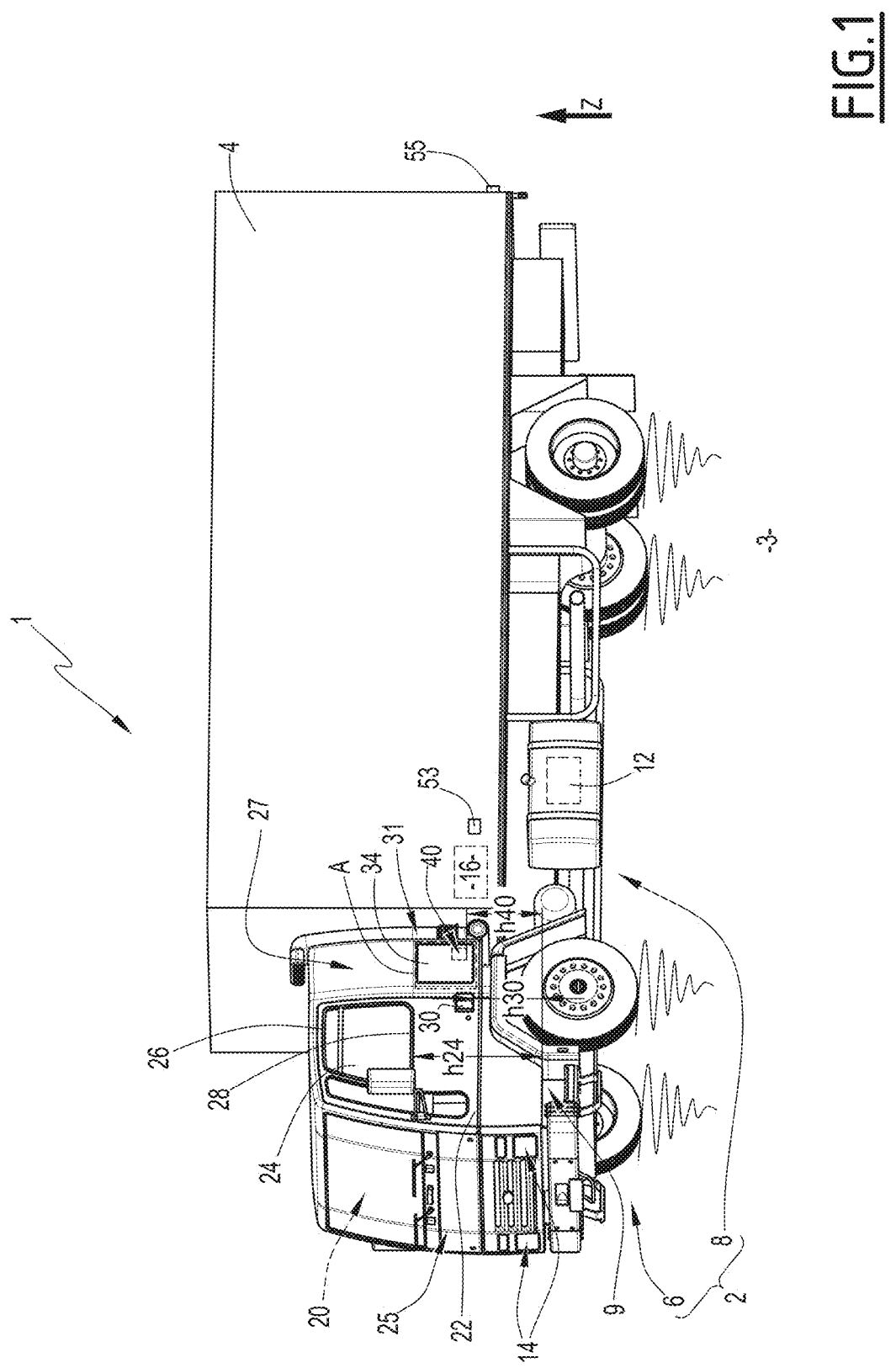
FIG. 1 is a truck according to an example.

FIG. 1 is an exemplary truck 1. The truck 1 represented in FIG. 1 is a semi-trailer truck, but the disclosure is not limited to this type of truck, and may be applied to other commercial vehicle such as heavy-duty vehicles, construction vehicles, specialized trucks such as garbage or fire trucks, etc.

The truck 1 stands on a ground 3 and comprises a tractor vehicle 2 and a semi-trailer 4. The tractor vehicle 2 comprises a cabin 6 and a chassis 8. The cabin 6 and the semi-trailer 4 are located on the chassis 8. The cabin 6 is secured to the chassis 8 via a bottom 9 of the cabin 6, while the semi-trailer 4 is removably connected to the chassis 8 and the cabin 6.

The truck 1 further comprises equipment, advantageously a plurality of equipment, each equipment being an equipment among a group comprising motor equipment 12 of the truck 1, auxiliary equipment 14 of the truck 1 and bodybuilder equipment 16 of the truck 1. Motor equipment 12 of the truck 1 may comprise equipment to start or stop a motor of the truck 1, to change a gear of the motor, or to perform maneuvers of the truck 1, such as parking the truck 1, and is schematically represented in FIG. 1. Auxiliary equipment 14 of the truck 1 may comprise headlights, lights inside or outside the cabin 6. Bodybuilder equipment 16 of the truck may comprise equipment specific to a function of the truck 1. For example, in FIG. 1, the truck 1 is a semi-trailer truck, therefore bodybuilder equipment 16 advantageously comprises a locking and unlocking system for the semi-trailer 4, which is schematically represented on FIG. 1.

In variant, the truck is a construction truck and the bodybuilder equipment may comprise a tipper and equipment for actuating the tipper, for example equipment for rotating the tipper to empty it.

The cabin 6 comprises an interior 20, a cabin door 22, also called door 22 movable between a closed position and an open position, in other words that can be opened and closed, a window 24 and an exterior surface 25. The interior 20 is accessible from an outside of the cabin 6 through the door 22.

The exterior surface 25 is a surface of the cabin 6 accessible from outside the cabin 6 when the door 22 is closed. The exterior surface 25 comprises a door side 27.

The door 22 is advantageously located on the door side 27 of the exterior surface 25. The door 22 advantageously comprises the window 24, in which case the window 24 is a door window. The window 24 is framed by a frame 26, which secures the window 24 to the door 22.

In variant not represented, the door does not comprise a window, and the window is a windshield of the cabin.

The window 24 is positioned at a window height h24, measured relative to the bottom 9 of the cabin 6 along a height direction Z. Advantageously, the window height h24 is measured from the bottom 9 of the cabin 6 to a bottom frame edge 28 of the window 24 and is inferior to 2 m.

The door 22 further comprises a door handle 30, also called handle 30. The handle 30 is located at a door handle height h30, measured relatively from the bottom 9 of the cabin 6 along the height direction Z. The door handle height h30 is for example comprised between 50 cm and 180 cm. The handle 30 is located on the exterior surface 25, and is therefore accessible from outside the cabin 6. The door handle 30 is operable from the outside of the cabin 6. In particular, when the cabin door 22 is engaged in the closed position, the door handle 30 is operable to disengage the cabin door 22 from the closed position to the open position, and then to open the door 22.

The cabin 6 further comprises an exterior compartment 31. The exterior compartment 31 comprises a hollow recess 32 and a lid 34. The hollow recess 32 is formed on the exterior surface 25, and is advantageously located on the door side 27. The lid 34 is closable and configured to move between a closed position, visible in FIG. 1, and an open position, visible in FIG. 2.

In the closed position, the lid 34 covers the hollow recess 32, and in the open position, the lid 34 leaves at least a portion of the hollow recess 32 uncovered.

In some examples, the lid 34 is locked when it is in the closed position, and can be unlocked by operating an unlocking control located inside the cabin 6. As a variant, the control located inside the cabin 6 is configured to both lock and unlock the lid 34 when the lid 34 is in the closed position. The lid 34 is moved in the closed position and in the open position independently of the position of the door 22. In other words, the user may move the lid 34 from the open to the closed position when door 22 is open.

In some examples, not represented, the cabin comprises more than one cabin door. In this case, the lid 34 is moved in the closed position and in the open position independently of a position of the cabin doors.

Figure 2:
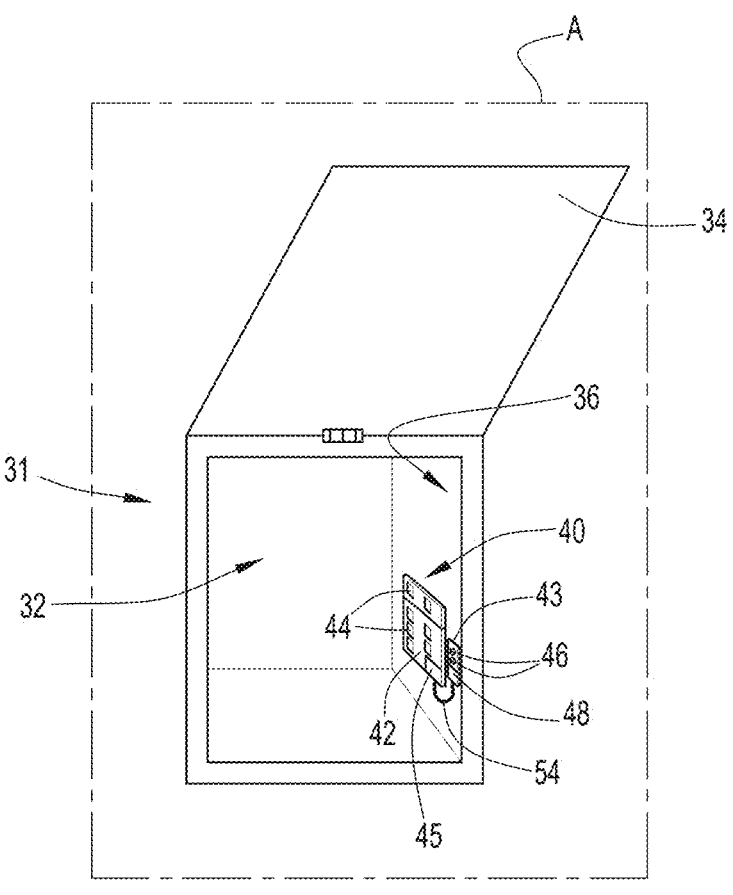
FIG. 2 is a detail A of the truck of FIG. 1.
Figure 3:
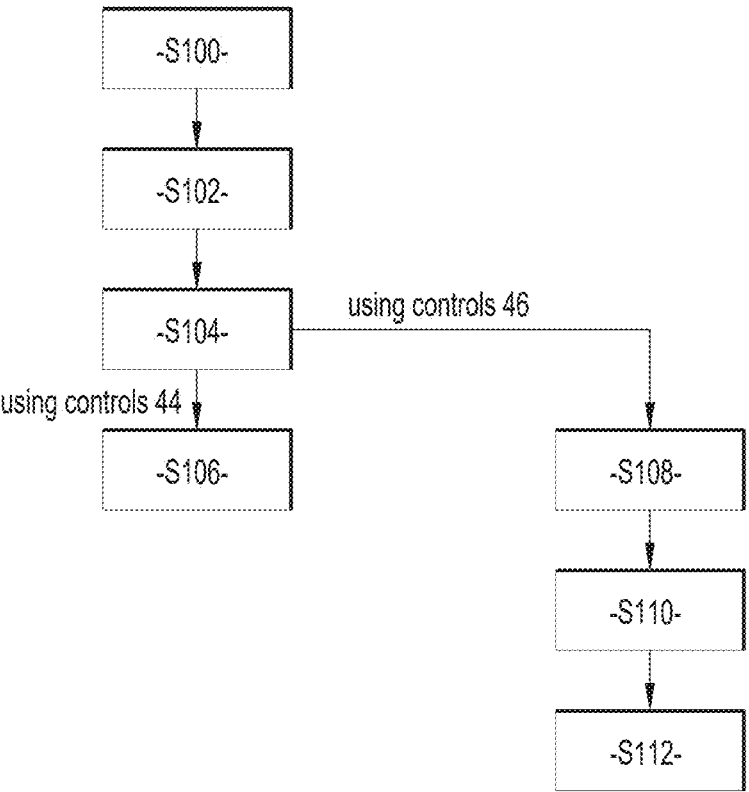
FIG. 3 is a diagram of a method for controlling an equipment of the truck.

The cabin 6 further comprises a control panel 40. In the example of FIGS. 1 and 2, the control panel 40 is secured to the exterior surface 25, on the door side 27, more precisely, it is secured inside the hollow recess 32, for example on a side surface 36 of the hollow recess 32. Therefore, the control panel 40 is secured next to the door 30, on the same side of the cabin 6 than the door 22.

The control panel 40 is secured inside the hollow recess 32 at a panel height h40, measured relative to the bottom 9 of the cabin 6 along the height axis Z.

As an example, The panel height h40 is equal or inferior to the window height h24 and to the door handle height h30, and is for example comprised between 50 cm and 150 cm from the bottom 9 of the cabin 6, so that the user can access the control panel 40 while standing on the ground 3.

The control panel 40 comprises a fixed part 42 and a removable part 43. The fixed part 42 is fixedly secured to the side surface 36, for example is screwed to the side surface 36. The fixed part 42 comprises at least one control 44, here multiple controls 44. Each control 44 is configured to be operated by the user, to control one equipment 12, 14, 16 of the truck 1. The controls 44 may be duplicates of controls located inside the cabin 6, or additional controls to the ones located inside the cabin 6. For example, one control 44 may turn the headlights on and off, another control 44 may lock and unlock the trailer 4 from the chassis 8, another control 44 may start the motor of the truck 1. In the example of the figures, the controls 44 are buttons, but in variant, some or all of the controls 44 may be joysticks, control knobs or wheels. Separate controls 44 may control the same equipment 12, 14, 16, for example one control 44 is be configured to turn on the motor of the truck 1 and another control 44 is configured to turn it off.

Advantageously, the fixed part 42 comprises a charging station 45.

In some examples that are not represented, the cabin comprises a charging station that is distinct from the fixed part.

The removable part 43 is removably secured to the side surface 36, for example it can be attached or detached from the side surface 36. The removable part 43 is movable between a secured configuration and a remote configuration. In the secured configuration, the removable part 43 is secured to the side surface 36, and in the remote configuration, the removable part 43 is removed from the side surface 36 and more generally, from the exterior surface 25, so that it can be held and the controls 46 can be operated at a distance from the exterior surface 25 by the user, in order to control the equipment 12, 14, 16 from this distance.

The removable part 43 is a remote control in the example of FIG. 2.

The removable part 43 comprises at least one, here multiple controls 46. Each control 46 is configured to be operated by the user, to control one equipment 12, 14, 16 of the truck 1. In the example of FIG. 2, the controls 46 are buttons, but in variant, some or all of the controls 46 may be joysticks, control knobs or wheels. The controls 46 may be duplicates of controls located inside the cabin 6, or additional controls to the ones located inside the cabin 6, and may be duplicates, or different controls than the controls 44 on the fixed part 42. For example, the controls 46 on the removable part 43 are controls for equipment 12, 14, 16 that needs to be operated from a distance of the truck 1, to improve safety or visibility of the user. Such controls may be maneuvering the truck 1, locking or unlocking the semi-trailer 4.

In some examples where the truck is a construction truck, such controls may be operating the bodybuilder equipment, for example tipping the tipper.

The removable part 43 advantageously comprises an embedded electrical storage 48, such as a battery, that powers the removable part 43. Advantageously, when the removable part 43 is in the secured configuration, it is connected to the charging station 45 with a wire 54, as represented in FIG. 2, or wirelessly, to supply electrical power to the embedded electrical storage 48, for example to charge the embedded electrical storage 48. Advantageously, when the removable part 43 is in the remote configuration, it is disconnected from the charging station 45, in particular, the removable part 43 is disconnected from the wire 54.

In some examples, the removable part is at all times connected to the fixed part by the wire.

The height h40 of the control panel 40, and its position on the exterior surface 25, in the example, on the side surface 26, means that the user may operate the controls 44 and 46 when standing outside the cabin 6, without otherwise being in contact with the cabin 6 or, more generally, with the truck 1, and with the door 22 closed. For example, the user operates the controls 44 and 46 while standing on the ground 3, and with the cabin door 22 closed. Similarly, the removable part 43 may be removed by the user from the side surface 26 with the user standing on the ground 3 and the door 22 closed. As a result, the user has a better field of view when operating the controls 44, 46, as it is not obstructed by the open door 22 and can stay at a safe distance from the truck 1, by controlling equipment 12, 14, 16 using the controls 46 on the removable part 43.

The truck 1 advantageously further comprises a sensor 53 and a camera 55. The sensor 53 is advantageously configured to measure a parameter representative of a state of an equipment 12, 14 or 16 of the truck 1. For example, the sensor 53 is a pressure sensor, configured to measure a pressure in the locking system for the semi-trailer 4, to determine if the locking of the semi-trailer 4 to the cabin 6 has been successful. In this case, the state of the locking system is either locked properly, or not locked properly.

In some examples, the sensor 53 is a proximity sensor, configured to determine a location of an obstacle and its distance with the truck. The state of the truck 10 is in those examples the distance between the truck 10 and the obstacle.

In some examples, the truck 1 advantageously comprises multiple sensors, each measuring a different parameter.

The camera 55 is configured to acquire images of immediate surroundings of the truck 1. By immediate surroundings it is meant surroundings that are at five meters or less from the truck 1.

In some examples, not represented, the truck comprises multiple cameras, in various locations of the truck.

In some examples, not represented, the control panel comprises only a fixed part.

In some examples, not represented, the cabin comprises more than one cabin door, for example two cabin doors, that give access to the interior of the cabin when they are open. In that case, the control panel is secured to the exterior surface so that the controls can be operated by the user when the user stands outside of the cabin and with all the cabin doors closed.

A method for controlling the equipment 12, 14, 16 is now described.

The removable part 43 is initially in the secured configuration, and the lid 34 is in the closed position.

Optionally, the user operates the unlocking control to unlock the lid 34 at step S100.

The user closes the door 22 at step S102.

The user moves the lid 34 from the closed position to the open position at step S104, so that the hollow recess 32 is accessible, and in particular, so that the control panel 40 in the hollow recess 32 is accessible to the user. Step 104 is advantageously performed with the user standing outside the cabin 6. For example, the user stands on the ground 3.

If the user wishes to operate the controls 44, then the user performs step S106. In step S106, the user operates the controls 44, to control the equipment 12, 14, 16 while the cabin door 22 is closed, the lid 34 is in the open position and the user is standing outside the cabin 6.

In variant, if the user wishes to operate the controls 46, the user moves the removable part 43 from the secured configuration to the remote configuration at step S108, therefore removing the removable part 43 from the exterior surface 25.

The user then holds the removable part 43 at a distance from the exterior surface 25 at step S110.

While the cabin door 22 is closed, and the user is standing outside the cabin 6, the user operates the controls 46, to control the equipment 12, 14, 16 at step S112. When performing step S112, the lid 34 may be in the closed or in the open position.

Figure 4:
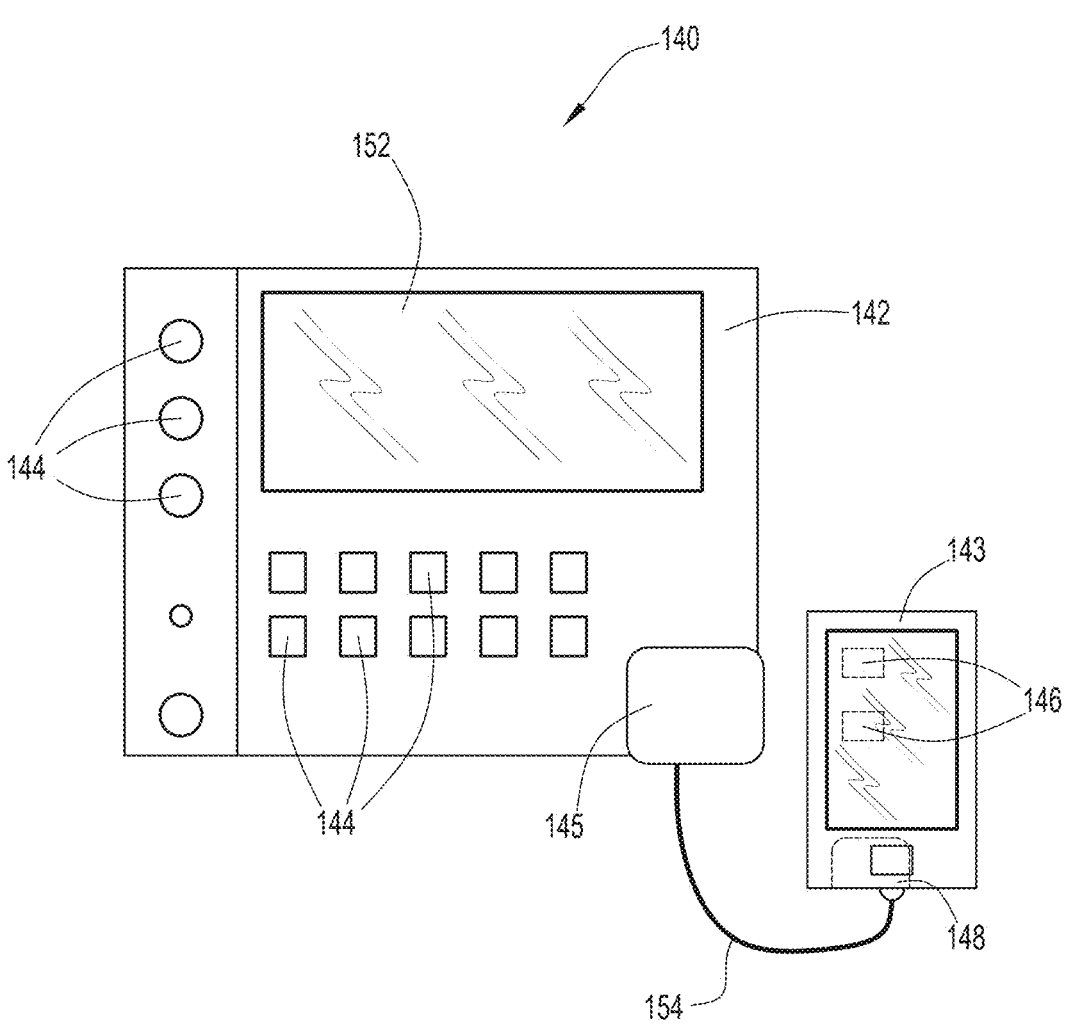
FIG. 4 is a control panel of a truck cabin according to another example.

FIG. 4 represents another example of a control panel 140, as an alternative to control panel 40. The control panel 140 is similar in function to the control panel 40, except for the differences described below. The control panel 140 comprises a fixed part 142 similar in function to the fixed part 42 and a removable part 143, similar in function to the removable part 43.

The fixed part 142 comprises at least one control 144, here multiple controls 144, similar, at least in function, to the controls 44 and a charging station 145, similar to the charging station 45. The removable part 143 comprises at least one control 146, here multiple controls 146, similar at least in function to the controls 46, and an embedded electrical storage 148 shown in a dashed line on FIG. 4, similar at least in function to the embedded electrical storage 48. The removable part 143 is a mobile terminal device, here a smartphone, and the controls 146 may be implemented as virtual buttons displayed on a screen of the smartphone, or as different mobile applications that the user selects.

The control panel 140 differs from the control panel 40 in that the fixed part 142 further comprises a display screen 152. The display screen 152 is advantageously configured to display a state of the equipment 12, 14, 16 currently controlled by the user, via one of the controls 144 or 146. In particular, the display screen 152 is configured to display the state of the locking system when the locking system is currently in use. Advantageously, the display screen 152 displays the parameter measured by the sensor 53. The display screen 152 is advantageously further configured to display additional information, for example states of other equipment 12, 14, 16 not currently in use, or general information relating to the truck 1 and its surroundings, such as images acquired by camera 55.

In FIG. 4, the removable device 143 is in the secured configuration and is connected to the charging station 145 by a wire 154. Advantageously, when the removable device 143 is in the remote configuration, the wire 154 is disconnected from the removable device 143 and the removable device is not connected to the charging station 145.

Example 1: A cabin 6, for a truck 1, the cabin 6 comprising:

a cabin door 22, to provide access for a user to an interior 20 of the cabin 6;

an exterior surface 25, the exterior surface 25 being a surface of the cabin 6 which is accessible from outside the cabin 6 when the cabin door 22 is closed;

a window 24, positioned at a window height h24 relative to a bottom 9 of the cabin 6; and a control panel 40; 140, comprising a plurality of controls 44, 46; 144, 146, each control 44, 46; 144, 146 being configured to be operated by the user to control an equipment 12, 14, 16 of the truck 1, wherein the control panel 40; 140 is secured to the exterior surface 25 at a control panel height h40, relative to the bottom 9 of the cabin 6, equal or inferior to the window height h24, so that the controls 44, 46; 144, 146 can be operated by the user when the user stands outside of the cabin 6 and with the cabin door 22 closed, each equipment 12, 14, 16 being an equipment among a group comprising:

motor equipment 12 of the truck;

auxiliary equipment 14 of the truck; and bodybuilder equipment 16 of the truck.

Example 2: The cabin 6 of example 1, further comprising an exterior compartment 31 comprising:

a hollow recess 32, formed on the exterior surface 25 of the cabin 6; and a closable lid 34, configured to move between a closed position, wherein the lid 34 covers the hollow recess 32, and an open position, wherein the lid 34 leaves at least a portion of the hollow recess 32 uncovered, the lid 34 being configured to move from the closed position to the open position independently from the position of the cabin door 22, and wherein the control panel 40; 140 is secured in the hollow recess 32.

Example 3: The cabin 6 of examples 1 or 2, wherein the exterior surface 25 comprises a door side 27, the cabin door 22 being located on the door side 27, and wherein the control panel 40 is secured on the door side 27.

Example 4: The cabin 6 of any of the previous examples, wherein the window 24 is a door window 24 equipped on the cabin door 22.

Example 5: The cabin 6 of any of the previous examples, wherein the window height h24 is measured at a bottom frame edge 28 of the window 24.

Example 6: The cabin 6 of any of the previous examples, wherein the cabin door 22 includes a door handle 30 positioned on the exterior surface 25 at a handle height h30 relative to the bottom 9 of the cabin 6, wherein the door handle 30 is operable from the outside of the cabin 6 for disengaging the cabin door 30 from a closed position, when the cabin door 30 was engaged in the closed position, wherein the control panel height h40 is equal or inferior to the door handle height h30

Example 7: The cabin 6 of any of the previous examples, wherein the control panel 140 further comprises a display screen 152 for displaying a state of the equipment 12, 14, 16 controlled by the control or for displaying images acquired by a camera 55 equipped on the truck 1.

Example 8: The cabin 6 of any of the previous examples, wherein the control panel 40, 140 comprises a fixed part 42; 142, fixedly secured to the exterior surface 25 and including at least one of the controls 44; 144.

Example 9: The cabin 6 of any of the previous examples, wherein the control panel 40; 140 comprises a removable part 43; 143, removably secured to the exterior surface 25 and including at least one of the controls 46; 146, wherein the removable part 43; 143 is movable between a secured configuration, wherein the removable part 43; 143 is secured to the exterior surface 25, and a remote configuration, wherein the removable part 43; 143 is removed from the exterior surface 25 for being held at a distance from the exterior surface 25 by the user to control the equipment 12, 14, 16 of the truck 1 from said distance.

Example 10: The cabin 6 of any of the previous examples, wherein the removable part 43 is a remote control 43.

Example 11: The cabin of any of the previous examples, wherein the removable part 143 is a mobile terminal device 143, such as a smartphone.

Example 12: The cabin of any of the examples 9 to 11, wherein the removable part 43;143 includes an embedded electrical storage 48; 148, wherein the cabin 6 further comprises a charging station 45; 145 secured to the exterior surface 25 and wherein the removable part 43; 143 is connected to the charging station 45; 145 when in the secured configuration for the charging station 45; 145 to supply electrical power to the embedded electrical storage 48; 148 and disconnected from the charging station 45; 145 when in the remote configuration.

Example 13: A truck 1 comprising a cabin 6 according to any of the previous examples.

Example 14: The truck of example 13, further comprising the equipment 12, 14, 16 controlled by the controls 44, 46; 144, 146 of the control panel 40; 140, said equipment 12, 14, 16 being an equipment 12, 14, 16 among a group comprising:

motor equipment 12 of the truck 1;
auxiliary equipment 14 of the truck 1; and
bodybuilder equipment 16 of the truck 1.

Example 15: The truck of examples 13 or 14, wherein the truck 1 further comprises a chassis 8, the cabin 6 being secured to the chassis 8 via the bottom 9 of the cabin 6.

Example 16: The truck of examples 14 or 15, wherein the cabin 6 is according to claim 7 and wherein the truck 1 comprises a sensor 53, configured to measure a parameter representative of the state of the equipment 12, 14, 16 controlled by the control 44, 46; 144, 146.

Example 17: The truck of examples 14 to 16, wherein the cabin 6 is according to claim 7, wherein the truck 1 comprises the camera 55, configured to acquire images of surroundings of the truck 1.

Example 18: A method, for controlling an equipment 12, 14, 16 of a truck 1, the equipment 12, 14, 16 being an equipment among a group comprising:

motor equipment 12 of the truck 1;
auxiliary equipment 14 of the truck 1; and
bodybuilder equipment 16 of the truck 1,
the truck 1 comprising a cabin 6, comprising:
a cabin door 22, to provide access for a user to an interior 20 of the cabin 6;
an exterior surface 25, the exterior surface 25 being a surface of the cabin 6 which is accessible from outside the cabin 6 when the cabin door 22 is closed;
a window 24, positioned at a window height h24 relative to a bottom 9 of the cabin 6; and
a control panel 40; 140, comprising a plurality of controls 44, 46; 144, 146, each control 44, 46; 144, 146 being configured to be operated by the user to control said equipment 12, 14, 16 of the truck 10, wherein the control panel 40; 140 is secured to the exterior surface 25 at a control panel height h40, relative to the bottom 9 of the cabin 6, equal or inferior to the window height h24,
the method comprising:
while the cabin door 22 is closed and the user is standing outside the cabin 6, operating S106, S112, the controls 44, 46; 144, 146 to control the equipment 12, 14, 16, by the user Example 19: The method of example 18, wherein the method further comprises moving a closable lid 34 from a closed position, wherein the lid 34 covers a hollow recess 32 formed on the exterior surface 25 of the cabin 6, to an open position wherein the lid 34 leaves at least a portion of the hollow recess 32 uncovered, wherein the control panel 40; 140 is secured in the hollow recess 32, and wherein operating S106 the controls 44, 46; 144, 146 includes that the lid 34 is in the open position, in addition to the cabin door 22 being closed and the user standing outside the cabin 6

Example 20: The method of any of the examples 18 and 19, wherein the control panel 40; 140 comprises a fixed part 42; 142, fixedly secured to the exterior surface 25 and including at least one of the controls 44, 46; 144, 146, the cabin 6 further comprising a removable part 43, 143, removably secured to the exterior surface 25 and including at least one of the controls 46; 146, the removable part 43; 143 comprising at least one of the controls 46; 146, wherein the method further comprises:

removing, at step S108, the removable part 43; 143 from the exterior surface 25 by the user;
holding at step S110 the removable part 43; 143 at a distance from the exterior surface 25 by the user; and
while the cabin door 22 is closed and the user is standing outside the cabin 6, operating at step S112 the at least one of the controls 46; 146 included on the removable part 43; 143, to control the equipment 12, 14, 16 of the truck 1, by the user.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A cabin, for a truck, the cabin comprising:
a cabin door, to provide access for a user to an interior of the cabin;
an exterior surface, the exterior surface being a surface of the cabin which is accessible from outside the cabin when the cabin door is closed;
a window, positioned at a window height relative to a bottom of the cabin; and
a control panel, comprising a plurality of controls, each control being configured to be operated by the user to control an equipment of the truck, wherein the control panel is secured to the exterior surface at a control panel height, relative to the bottom of the cabin, equal or inferior to the window height, so that the controls can be operated by the user when the user stands outside of the cabin and with the cabin door closed, each equipment being an equipment among a group comprising:
motor equipment of the truck;
auxiliary equipment of the truck; and
bodybuilder equipment of the truck.

2. The cabin of claim 1, wherein the cabin further comprises an exterior compartment comprising:
a hollow recess, formed on the exterior surface of the cabin; and
a closable lid, configured to move between a closed position, wherein the lid covers the hollow recess, and an open position, wherein the lid leaves at least a portion of the hollow recess uncovered, the lid being configured to move from the closed position to the open position independently from the position of the cabin door;
wherein the control panel is secured in the hollow recess.

3. The cabin of claim 1:
wherein the exterior surface comprises a door side, the cabin door being located on the door side; and
wherein the control panel is secured on the door side.

4. The cabin of claim 1, wherein the window is a door window equipped on the cabin door.

5. The cabin of claim 1, wherein the window height is measured at a bottom frame edge of the window.

6. The cabin of claim 1:
wherein the cabin door includes a door handle positioned on the exterior surface at a handle height relative to the bottom of the cabin;
wherein the door handle is operable from the outside of the cabin for disengaging the cabin door from a closed position, when the cabin door was engaged in the closed position; and
wherein the control panel height is equal or inferior to the door handle height.

7. The cabin of claim 1, wherein the control panel further comprises a display screen for displaying a state of the equipment controlled by the control or for displaying images acquired by a camera equipped on the truck.

8. The cabin of claim 1, wherein the control panel comprises a fixed part, fixedly secured to the exterior surface and including at least one of the controls.

9. The cabin of claim 1:
wherein the control panel comprises a removable part, removably secured to the exterior surface and including at least one of the controls;
wherein the removable part is movable between a secured configuration;
wherein the removable part is secured to the exterior surface and a remote configuration; and
wherein the removable part is removed from the exterior surface for being held at a distance from the exterior surface by the user to control the equipment of the truck from the distance.

10. The cabin of claim 9:
wherein the removable part includes an embedded electrical storage;
wherein the cabin further comprises a charging station secured to the exterior surface; and
wherein the removable part is connected to the charging station when in the secured configuration for the charging station to supply electrical power to the embedded electrical storage and disconnected from the charging station when in the remote configuration.

11. A truck comprising the cabin of claim 1.

12. The truck of claim 11, further comprising the equipment controlled by the controls of the control panel, the equipment being an equipment among a group comprising:
motor equipment of the truck;
auxiliary equipment of the truck; and
bodybuilder equipment of the truck.

13. A method, for controlling an equipment of a truck:
the equipment being an equipment among a group comprising:
motor equipment of the truck;
auxiliary equipment of the truck; and
bodybuilder equipment of the truck;
the truck comprising a cabin, comprising:
a cabin door, to provide access for a user to an interior of the cabin;
an exterior surface, the exterior surface being a surface of the cabin which is accessible from outside the cabin when the cabin door is closed;
a window, positioned at a window height relative to a bottom of the cabin; and
a control panel, comprising a plurality of controls, each control being configured to be operated by the user to control the equipment of the truck, wherein the control panel is secured to the exterior surface at a control panel height, relative to the bottom of the cabin, equal or inferior to the window height;
the method comprising:
while the cabin door is closed and the user is standing outside the cabin, operating, the controls to control the equipment, by the user.

14. The method of claim 13:
wherein the method further comprises moving a closable lid from a closed position, wherein the lid covers a hollow recess formed on the exterior surface of the cabin, to an open position wherein the lid leaves at least a portion of the hollow recess uncovered, wherein the control panel is secured in the hollow recess; and wherein operating the controls includes that the lid is in the open position, in addition to the cabin door being closed and the user standing outside the cabin.

15. The method of claim 13, wherein the control panel comprises a fixed part, fixedly secured to the exterior surface and including at least one of the controls, the cabin further comprising a removable part, removably secured to the exterior surface and including at least one of the controls, the removable part comprising at least one of the controls, wherein the method further comprises:

removing the removable part from the exterior surface by the user;

holding the removable part at a distance from the exterior surface by the user; and while the cabin door is closed and the user is standing outside the cabin, operating the at least one of the controls included on the removable part, to control the equipment of the truck, by the user.

\* \* \* \* \*